United States Patent Office 2,771,788
Patented Nov. 27, 1956

2,771,788

CONTROL MECHANISM

Charles H. Frick and Glenn R. Hickson, Pontiac, Mich., assignors to General Motors Corporation, Detroit, Mich., a corporation of Delaware Application April 30, 1954, Serial No. 426,868

14 Claims. (Cl. 74—472)

This invention relates generally to a control mechanism and more particularly to a power plant control mechanism which, by way of example, might be used to advantage on a power plant including an engine and a fluid coupling.

The primary object of this invention is to provide a simple improved power plant control mechanism whereby improved output acceleration characteristics are obtained with efficient engine operation.

Another object of this invention is to provide a simple improved control mechanism for a power plant including an engine, fluid coupling, and an auxiliary transmission driven by the engine through the fluid coupling whereby improved output acceleration characteristics are obtained with efficient engine operation.

A further and still more specific object of this invention is to provide such a power plant with a control mechanism limiting the fuel supplied the engine during periods of engine acceleration between the controlled idle speed and maximum engine speeds and providing for a higher engine maximum speed when the low and intermediate acceleration drive ratios of the transmission are utilized.

These and other objects of the invention will become apparent and more thoroughly understood from the following description of a preferred embodiment thereof in which reference is made to the attached drawings, in which:

Figure 1:
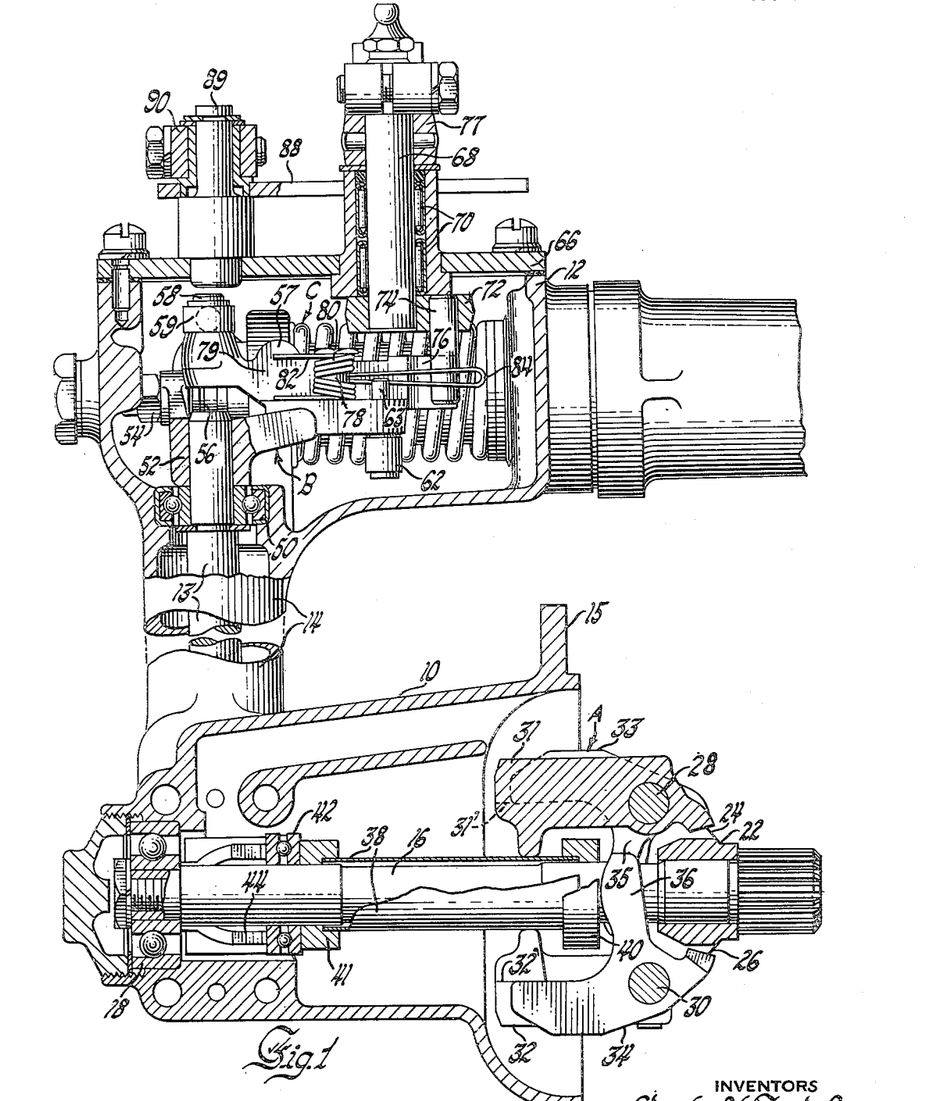
Figure 1 is a broken sectional view of the type of governor which may be utilized in the control mechanism of my invention.

The governor mechanism shown in Figure 1 has a speed responsive centrifugal assembly A rotatably mounted in a bell-shaped lower casing portion 10 and a fuel feed control mechanism B and speeder spring assembly C housed in an upper casing portion 12. A shaft 13 housed in an intermediate tubular casing portion 14 interconnects the rotating centrifugal assembly A with the feed control mechanism B. The various portions of the casing may be cast integrally or cast separately and suitably secured to one another; in either case being provided with necessary openings for assembly and in-operation access. A flange 15 is provided on the bell-shaped casing member 10 and is adapted to be bolted or otherwise secured to the housing of the driving device.

As best shown in Figure 1 the rotatable speed responsive centrifugal assembly A includes a short shaft 16 having one end journaled in an antifriction bearing 18 carried by the closed end of the lower casing. The opposite end of the shaft 16 is adapted to be secured to and driven by a rotating shaft of the engine or driving device, not shown, to which the governor is applied. A centrifugal weight-carrying member 22 secured to and driven by the shaft 16 is flanked with parallel axially and radially extending winged support members as shown at 24 and 26. A pair of relatively heavy centrifugal members 31 and 32 are pivoted on pivot pins 28 and 30, respectively, which are carried by the support members 24 and 26 in equidistant space relation to the shaft 18. A second pair of relatively light centrifugal members or flyweights 33 and 34 are also pivoted on the pins 28 and 30, respectively, and like the heavy members 31 and 32 are attached to swing outwardly around their respective pivots when the shaft 16 is rotated. The centrifugal members 31 and 32 are formed to provide axially extending abutments 31' and 32' which engage the lighter members during outward movement of the members 31 and 32. The centrifugal members are so formed as to abut the carrier 22 after the members have swung outwardly to a limited extent. It will be noted, however, that the lighter members are permitted a greater extent of outward movement than that permitted the heavy members. The lighter weights 33 and 34 are provided with inwardly extending cam lugs of crank arms 35 and 36, respectively. A riser sleeve 38 carried by the shaft 18 has an annular flange or washer member 40 and 41 at each end. The washer 40 is in thrust engagement with the cam lugs 36 and 35 and the washer 41 at the opposite end of the sleeve 38 is provided with an anti-friction thrust bearing 42 which is adapted to engage a forked or yoked member 44 suitably secured to the shaft 13 which is suitably journaled within the casing as shown at 48 and 50.

Figure 2:
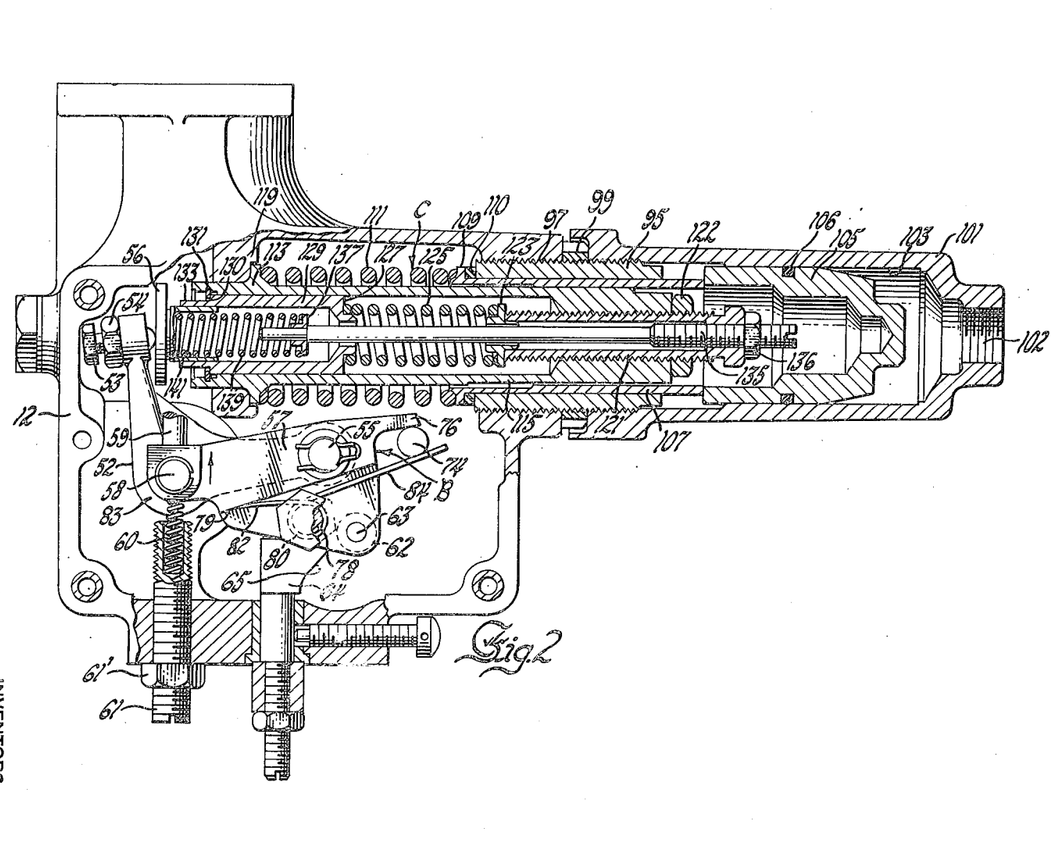
Figure 2 shows a broken horizontal section of the upper portion of the governor shown in Figure 1.
Figure 3:
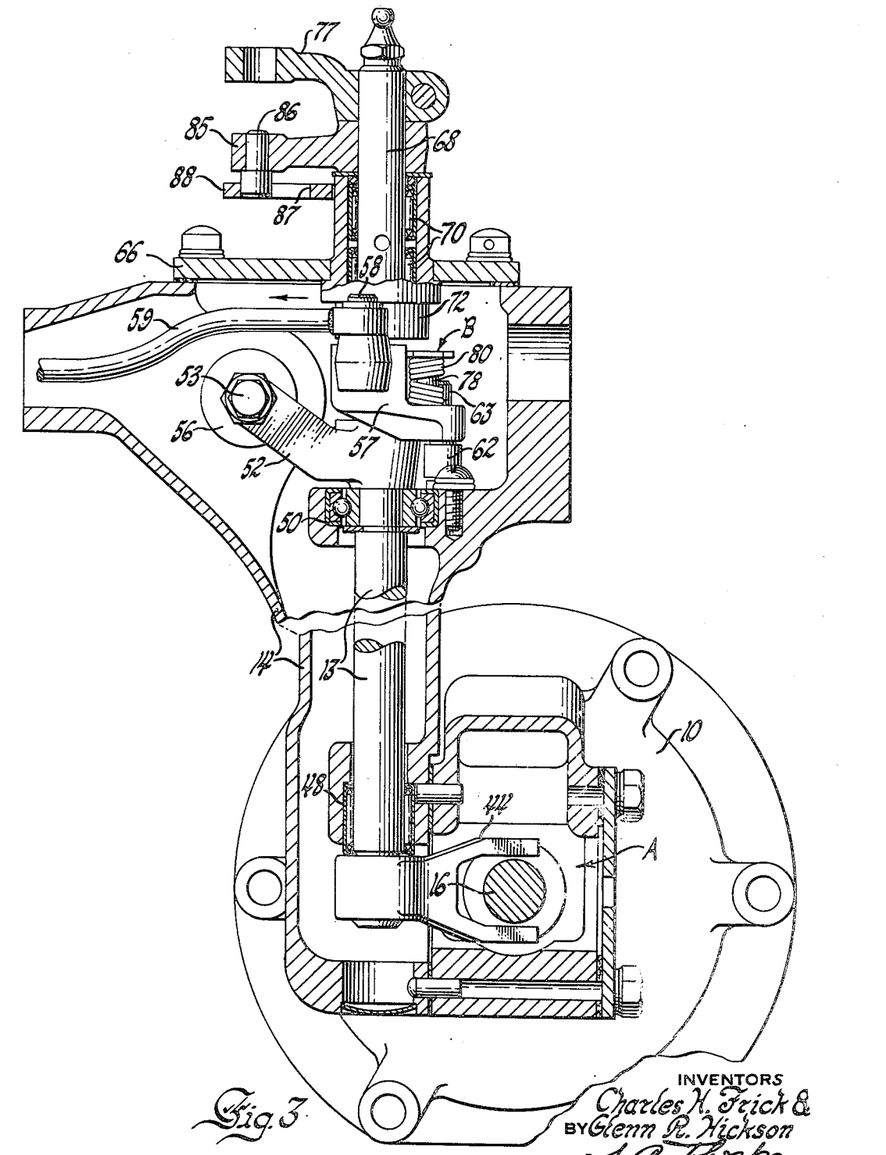
Figure 3 is another sectional view of such a governor taken normal to the planes of Figures 1 and 2.

As shown in Figures 1 and 3 a bell crank shaped operating lever 52 is secured to the upper end of the shaft 13 and is adapted to oscillate as the shaft 13 is turned by the action of the centrifugal weights upon the sleeve 38 and the yoke 44. One arm of the bell crank lever carries a low speed gap adjusting screw 53 which is adapted to engage the spring cap plate 56 of the speeder spring assembly C and is maintained in proper adjustment by the lock nut 54. The low speed gap adjustment screw 53 provides a means for coordinating the low speed speeder spring with the position of the centrifugal weights as will be explained more fully below. The other arm of the lever 52 carries a pin 55 on which a floating differential actuating lever 57 is pivotally mounted. One end of the floating lever carries a pin 58 which is connected to the engine fuel control rack, not shown, by the link 59. A buffer spring 60 is placed between this end of the lever 57 and a spring seat 61 which is adjustably threaded into an opening in the casing member 12 and secured in place by means of a lock nut 61'. The other end of the floating actuating lever 57 has a roller 62 rotatably supported thereon by a pin 63. A cam 64 is adjustably mounted within the upper casing 12 and is provided with a tapered cam surface 65 as shown in Figure 2 extending adjacent the roller 62 on the floating crank lever 57 for contact by this roller.

Figures 4, 5:
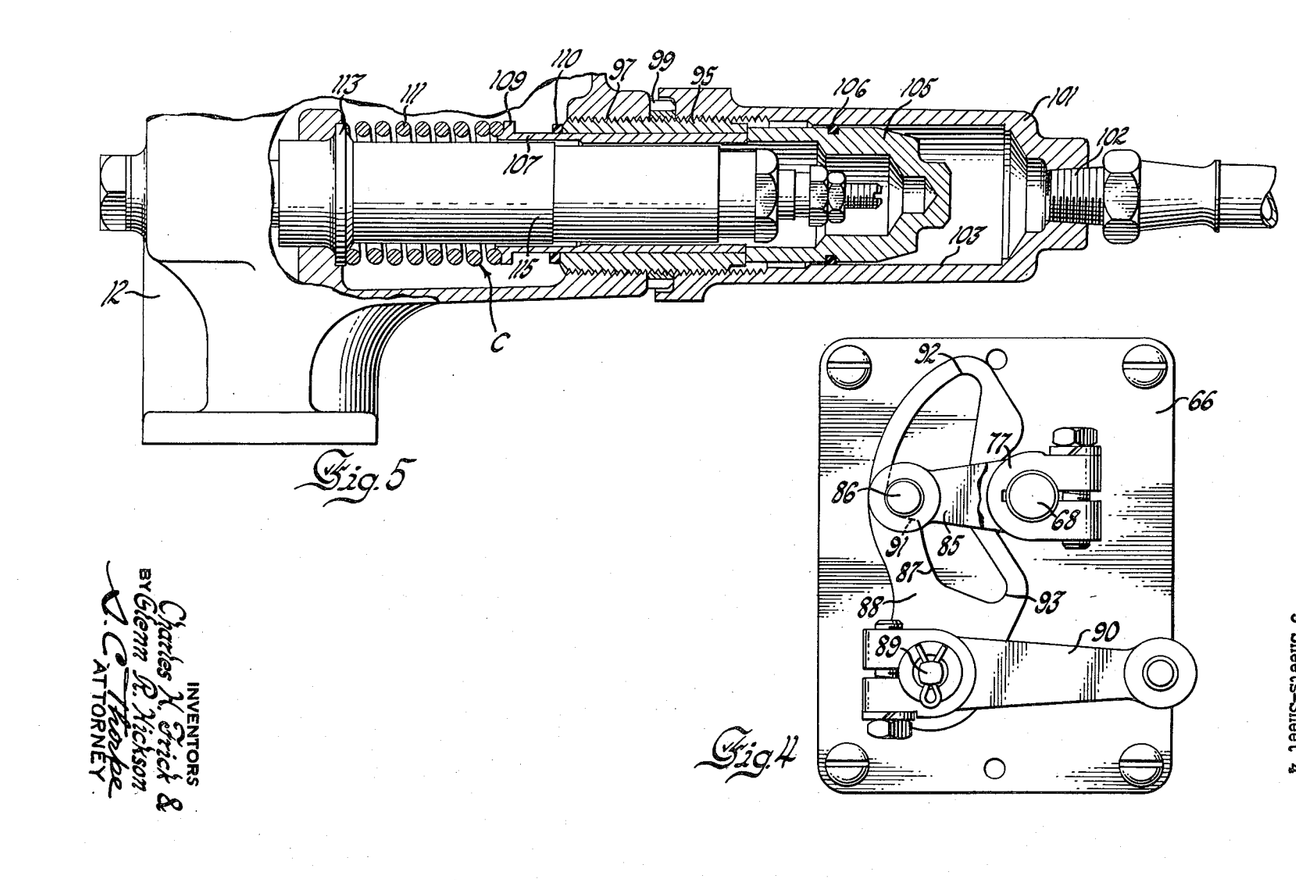
Figure 4 is a top view of the governor control housing showing the manual engine governor control linkages.
Figure 5 is similar to Figure 2 and shows a second operative position.

As shown by Figures 1, 3 and 4, a vertical throttle shaft 68 having a lever 72 secured to the lower end thereof adjacent the floating lever 57 within the casing is rotatably supported in a bearing assembly 70 mounted in a detachable cover 66 provided for the upper portion of the casing 12. A pin 74 is secured to the lever 72 and is adapted to contact a downwardly extending vertical abutment surface on an arm portion 76 of the lever 57.

A torsion spring 80 having an intermediate helical portion flanked by two leaf or lever portions is mounted on the floating lever 57 by the pin 78 which, as best shown in Figure 2, is located adjacent a downwardly extending vertical abutment face 79 formed on the lever 57 adjacent the pivot pin 55. The shorter leaf portions 82 of the spring 80 bear against the vertical abutment face 79. A second and longer leaf portion 84 of the spring 80 bears against the pin 74 and serves to oppose rotation of the lever 72 in a fuel increasing direction. Consequently, such rotation causes the spring to exert a clockwise biasing force on the differential actuating lever 57 about its pivot 55 thereby maintaining the roller 62 in contact with the cam surface 65 during periods of engine acceleration and deceleration between the idle or low engine speed setting and the maximum engine speed setting thereby limiting or modulating the amount of fuel supplied the engine.

An external lever 77 is secured to the upper outer end of the throttle shaft 68 for operation by either a hand-throttle lever or the accelerator foot pedal, not shown, by suitable connections, not shown. As shown in Figures 3 and 4, a second external lever 85 is also secured to the upper outer end of the throttle shaft 68 and provided at its free end with a downwardly extending pin 86 which extends within a slot 87 formed in an engine control cam plate 88. The cam plate 88 is pivotally mounted on a spindle 89 mounted in the closure plate 66. An engine control lever 90 is also pivotally mounted on the spindle 89 and is drivingly connected to the control plate 88. In Figure 4 the pin 86 is shown in an engine idle control position being in contact with a notch 91 in the cam plate 88. When the control plate is in the position shown in Figure 4, the throttle control, not shown, can rotate the levers 77 and 85 only between the engine idle position 91 and to the engine high speed position notch 92; clockwise rotation of the levers 77 and 85 being in a fuel increasing direction. If the engine control lever 90 and the engine control cam are rotated in a counterclockwise direction, the pin 86 will disengage the notched side of the cam plate slot 87 and as the counterclockwise rotation of the cam plate continues the pin will engage the opposite side of the slot and be cammed in a counterclockwise direction moving the lever 85 to the engine "off" position; the pin 86 engaging the engine "off" notch 93. Every movement of the lever involves a corresponding movement of the lower lever 72, thus oscillating the differential lever 57 about its floating pivotal connection 55 with the bell crank operating lever. Hence movement of the levers 85 and 90 to the engine "off" position results in moving the fuel rack connecting link 59 to stop the engine by cutting off the fuel supply. Movement of the link 59 in the engine stopping or off position is cushioned by the buffer spring 60.

The speeder spring assembly, as best shown by Figure 2, comprises a series of springs sequentially operable to oppose the speed-responsive movement of the centrifugal assembly A. A hollow adjustable abutment member 95 threadably extends from an opening 97 in the upper casing portion 12 coaxially spaced of the low speed spring cap 56. The member 95 serves as a high speed spring adjusting screw and is maintained in proper adjustment by a lock nut 99. A housing member 101 provides a cylinder 103 for a piston 105, the purpose of which will be explained later, and serves as a cover for the complete spring assembly. The member 95 provides a stop for the axial movement of the piston 105. A sleeve 107 bears against the piston 105 and is slidably mounted within the hollow member 95. The distal end of the sleeve 107 is provided with an external flange 109 which serves as one of the seats for the high speed spring 111. The opposite end of the spring 111 is seated against an external flange 113 formed on a hollow high speed speeder spring plunger 115 which is disposed in concentric relation within the spring 111. The high speed plunger 115 is reciprocably mounted within the sleeve 107 at one end and an opening provided in a bracket 119 formed integrally with the casing portion 12. The bracket 119 also serves as an abutment member against which the external flange 113 of the plunger is urged by the high speed spring 111.

A hollow adjustment screw 121 threaded into the outer end of the high speed spring plunger 115 is provided with a flanged spring seat 123 for the outer end of an intermediate speeder spring 125. The screw 121 is maintained in proper adjustment by a lock nut 122. The opposite or inner end of the intermediate spring 125 bears on a flange 127 of a hollow spring seat plunger member 129 reciprocably mounted within the high speed plunger 115 and having an external shoulder 130 thereon urged by the spring 125 into engagement with a snap ring 131 in an internal groove in the inner end of the hollow plunger 115 so that the reduced diameter inner end portion 133 of the hollow spring seat 129, forming the shoulder 130, extends from the spring plunger 115.

Another adjustment screw 135 is adjustably threaded into the outer end of the hollow screw 121 and is provided with a reduced diameter inner end portion supporting a spring seat 137 for the low or idle speed spring 139. The screw 135 is maintained in proper adjustment by a lock nut 136. The opposite end of the low speed spring 139 is seated within a bore 141 formed within the spring cap plate 56 which is reciprocably mounted within the intermediate spring plunger 129 and, as mentioned above, is in thrust engagement with the low speed gap adjustment screw 53.

The cylinder 101 has a port 102 connected to a fluid pressure source, not shown, by suitable valved connections to be discussed in greater detail below. When fluid is supplied to the cylinder 101 the piston 105, which is properly sealed against fluid leakage between the cylinder and piston as shown at 106, the piston 105 and sleeve 107 are shifted axially to the left increasing the biasing effect of the high-speed speeder spring on the high-speed plunger 115 thereby increasing the maximum engine speed above that value previously allowed. The differential between the two maximum speed values in the two operative positions of the piston may be reduced by the use of one or more shims 110 which effectively increase the length of the member 95, and the magnitude of the maximum speed values are controlled by the axial location of the member 95 within the opening 97.

Figure 6:
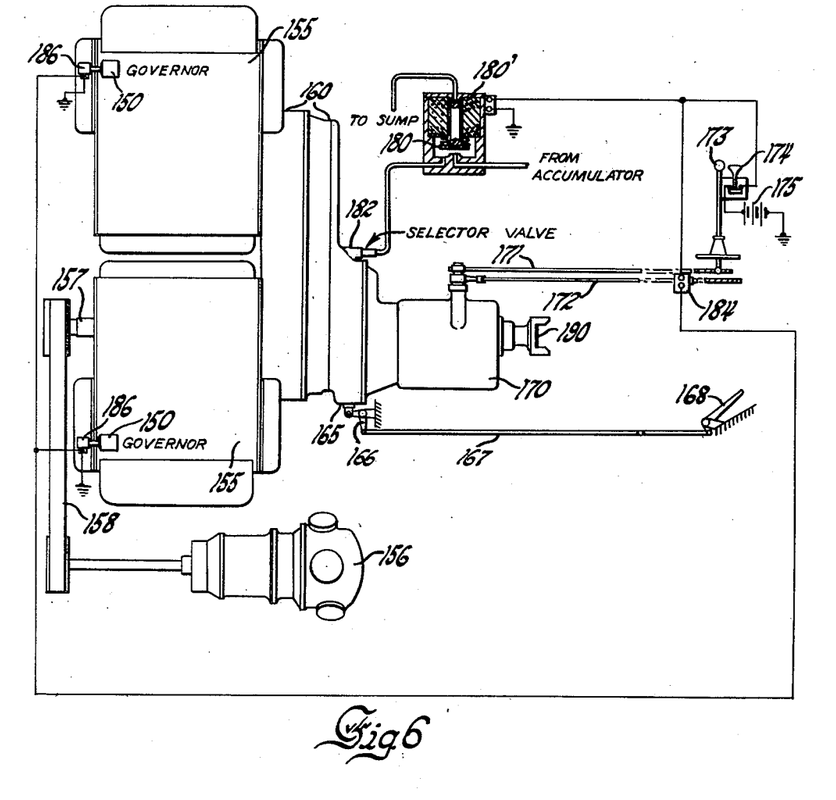
Figure 6 is a schematic showing of an example of power plant installation in which the invention may be embodied.

Figure 6 shows a power plant having twin engines utilizing the above described governor mechanism and a transmission including a fluid coupling, a two-speed clutch, and an auxiliary change-speed transmission. While the governor mechanism has particular utility in a power plant unit including a fluid coupling, its use is applicable and has utility in any power plant unit having an engine driven plural speed transmission giving improved acceleration for both the engine and unit output in the accelerating low and intermediate transmission drive ratios and limiting the maximum engine speed in high speed transmission drive ratios to a value less than when the accelerating drive ratios are being used. The power plant shown in Figure 6, includes a governor mechanism 150, such as described above, mounted on each of the twin engines 155 which have their several outputs combined through a transmission including a fluid coupling and gear unit 160 driving in turn a single two speed clutch mechanism 165, an auxiliary change speed transmission 170, and a power plant output shaft 190. The power plant is also provided with an accessory compressor mechanism as indicated at 156 which is drivingly connected to the crankshaft 157 of one of the engines by suitable means as indicated by 158.

In the power plant shown the clutch mechanism 165 is engaged or disengaged through suitable linkages 166 and 167 by a clutch pedal 168. The clutch mechanism has provision for both direct drive and overdrive therethrough thereby doubling the available change-speed drive ratios of the auxiliary transmission. The transmission is provided with conventional shift rods 171 and 172 for reverse drive and for forward gear drive ratios, respectively, operable by a gear shift selector lever 173. Shifting of the gear shift selector lever from one transmission drive ratio to another is accomplished with the clutch mechanism disengaged. An overdrive selector switch 174 is mounted on the gear shift lever 173 and is in series with a solenoid operated pressure supply valve 180 and an electrical power source 175. The switch 174 in its closed position serves to energize the solenoid 180' opening the valve 180 to supply fluid pressure from a pressure accumulator, not shown, to an overdrive selector valve 182 which supplies pressure to an energizing cylinder, not shown, placing the clutch mechanism in overdrive.

The switch 174 and the electrical power source are also in series with a second switch 184, and solenoid operated governor control valves 186. When deenergized, the valves 186 are adapted to supply fluid pressure from a suitable source, not shown, such as air from the scavenging and charging compressor outlet on a two-cycle engine, to their respectively controlled cylinders 103 where the piston 105 is shifted axially to the left increasing the bias exerted by the sleeve 107 on the high speed speeder spring 111 thereby increasing the maximum engine speed above that value allowed when the gear shift rod 172 is in the high speed drive ratio position. When the overdrive selector switch 174 is closed, the second switch 184 is operable by gear shift rod 172 when in the high speed drive ratio selecting position to energize the solenoid operated valves 186 which vent their respective cylinders 103 to atmosphere thereby decreasing the high speed spring ratio and the maximum governed speed. Consequently, when the combined clutch and auxiliary transmission mechanisms are in low and intermediate drive ratios including high speed without overdrive, the engine is governed at a higher maximum speed permitting faster acceleration response of the power plant at the output shaft 190.

From the foregoing description of the power plant control mechanism it is believed that its operation as it is incorporated in a power plant including an engine and a plural speed transmission will be readily apparent. As best seen in Figure 1 with the engine shut down, the heavy low and lighter high speed governor weights 31, 32 and 33, 34, respectively, are in the position shown and the engine is started in the following manner. The manually operable external levers 77 and 85, shaft 68 and lever 72 are moved clockwise from the engine shutdown position through and beyond the engine idle control position to a position between the idle and the full speed and torque-setting positions. This causes the pin 86 on the lever 85 to exert force on the notched side of the slot 87 of the engine control cam plate 88 thereby moving this plate and the lever 90 connected thereto to an engine running position. The clockwise rotation of the shaft 68 and lever 72 causes the pin 74 to exert force on the leaf portion 84 of the torsion spring 80 mounted on the floating differential actuating lever 57 and tends to move the lever 57 in a clockwise direction about the pivot pin 55 of the speed responsive operating lever 52 which is now stationary with the engine at rest and the weights 31, 32, 33 and 34 in the position shown in Figure 1. Clockwise movement of the floating differential actuating lever 57 continues until the roller 62 thereon contacts the adjacent fuel modulating cam 64 and the extent of this movement causes the distal end of the floating lever 57 to move the fuel control link 59 in the direction of the arrows shown in Figures 2 and 3 to increase the engine fuel for starting. After starting of the engine the manually operable levers 77 and 85 and consequentially the lever 72 are returned to the idle speed and torque-setting position 91 as best shown in Figure 4.

Starting of the engine causes outward movement of the heavy low and lighter high speed governor weights 31, 32 and 33, 34, respectively, movement of the governor sleeve 38 to the left against the action of the idle speed spring 139 through the yoke 44, the shaft 13, and the operating lever 52. With the manual levers 77 and 85 in the idle position and the engine operating at idling speed, the low speed spring cap plate 56 abutting the low speed adjusting screw 53 of the operating lever 52 is displaced only a slight distance from the adjacent reduced diameter portion 133 of the hollow intermediate spring seating plunger 129. Also with the engine operating at idling speed, the roller 62 on the floating lever 57 is displaced slightly out of contact with the cam surface 65 of the fuel modulating cam 64 and the outer end of the buffer spring 60 is in light contact with the adjacent end of the fuel control link 59 as best shown in Figure 2.

With the engine idling, if the engine speeds up slightly the low and high speed governor weights 31, 32 and 33, 34 will move outwardly moving the sleeve 38 to the left to cause clockwise movement of the levers 44 and 52 and the interconnecting vertical shaft 13 against the force of the idle spring 139. Clockwise movement of the lever 52 and pin 55 thereon causes a corresponding movement of the floating lever 57 and as the vertical abutment face arm 76 thereon is fulcrumed on the pin 74 of the lever 72, the left end of the lever 57 and fuel control link is moved in the opposite direction to the arrow in Figures 2 and 3 to reduce the engine fuel and therefore reduce the speed of the engine to the proper idling speed value. This causes the roller 62 to be moved further away from the fuel modulating cam 64 and causes the fuel control link 59 to compress the buffer spring 60. If the engine speed falls below the idle value the idle spring 139 will cause counterclockwise movement of the lever 52 and the pin 55 thereon, the yoke lever member 44, and the interconnecting shaft 13 moving the governor sleeve 38 to the right causing the governor weights 31, 32 and 33, 34 to be moved inwardly. This causes counterclockwise movement of the floating lever 57 about the pin 55 thereon now fulcrumed on the leaf spring portion 84 to cause the left end of the floating lever to move the fuel control link 59 in the direction of the arrow and increase the engine fuel and speed to the correct idle value. It will be evident that the buffer spring 60 opposes fuel decreasing movement of the fuel control link and aids in increasing fuel movement thereof to maintain engine idling speed at the proper value and to prevent hunting of the engine speed in conventional maner.

Control of the engine in the range between idle and full speed and torque values is accomplished as follows.

With the engine idling a sudden clockwise movement of the manual lever 85 from the idle position 91 toward the full speed and torque position 92 causes the pin 74 on the lever 72 to exert force on the leaf spring portion 84 of the torsion spring 80 of the floating lever 57 moving the lever 57 clockwise a limited amount about the pin 55 causing only a slight increase in the fuel supply of the engine as the roller 62 immediately moves a slight distance and contacts the cam surface 65 of the fuel modulating cam 64 and prevents further increase in the engine fuel. Upon contact of the roller 62 with the cam 64, further clockwise movement of the manual levers 85 and 72 relative to lever 57 results in slight bending of the leaf spring portion 84 of the spring 80 which tends to rotate the lever 57 clockwise in a fuel increasing direction about the pin 55.

If there is little load on the engine the slight increase in fuel supplied the engine will cause an immediate increase in the engine speed and the low and high speed governor weights 31, 32 and 33, 34 move outwardly initially against the action of the idle spring 139 only. Further outward movement of the weights upon further increase in engine speed brings the heavier low speed weights 31 and 32 into abutting contact with the weight carrying member 24 stopping further outward movement of the low speed weights. At this time, if the low-speed adjusting screw 53 is properly adjusted, the spring cap plate 56 contacts the reduced diameter projecting end portion 133 of the intermediate spring seating plunger 129. Further increase in the engine speed, up to the full speed value, causes further outward movement of the lighter high speed governor weights 33, 34 opposed by the combined forces of the idle and intermediate spring 139 and 125. The initial outward movement of the low and high speed weights and subsequent outward movement of the high speed weights only, causes the governor sleeve 38 to be moved to the left, as viewed in Figure 1 with resultant clockwise movement of the levers 44 and 52 and the interconnecting shaft 13. The increased engine speed causes the lever 52 to apply a downward force on the floating lever 57 as viewed in Figure 2 through the pivot pin 55. As the pin 74 on the lever 72 is also applying a downward force on the floating lever 57 through the bent torsion spring 80 producing a clockwise couple about a point adjacent the pin 55, the floating lever 57 will be translated downwardly and rotated clockwise to shift the fuel control link 59 in a fuel increasing direction with the roller 62 on the lever 57 being maintained in contact with and rolling toward the reduced end of the cam surface 65 of the fuel modulating cam 64.

Should the engine be loaded to a greater degree when the manual control lever 85 is moved suddenly clockwise toward the full speed and torque position, the engine speed will increase more slowly in response to the initial increase in fuel supplied the engine which, as described above, is limited by clockwise movement of the floating lever 57 about the pin 55 permitted until the roller 62 on the floating lever contacts the fuel modulating cam 64. The spring portion 84 on the floating lever 57 is consequently bent more when there is more load on the engine as the floating lever cannot be further rotated to increase the engine fuel by the spring 80 until the engine speed increases or the load thereon decreases which again causes clockwise rotation of the governor operating lever 52 and the pivot pin 55 thereon on which the floating lever 57 is mounted to then increase the engine fuel and torque. It will be noted that any speed and torque value may be selected by movement of the manually operable levers 85 and 72 and the governor fuel modulating cam mechanism then acts to limit the amount of fuel supplied the engine to the available engine speed and torque value without overloading the engine with excess fuel with resultant incomplete combustion and smoking of the engine.

Overloading of the engine with access fuel with resultant incomplete combustion, and smoking of the engine in the immediate speed ranges is particularly characteristic of high speed Diesel engine operation of the two-cycle type engine in which an air scavenging and charging blower and high pressure fuel injection pumps are driven by the engine; the amount of fuel being supplied to the engine is proportional to the engine torque and usually set by manual control means and limited at low and high engine speeds corresponding to idle and maximum speed of the engine by the engine governor mechanism. These engines are usually supplied with excess scavenging and charging air throughout the operating speed range of the engine and the injection pumps are designed to supply proper amounts of fuel for the air supplied at each engine speed. However, in that the amount and pressure of the air supplied by the blower and also the pressure and leakage of fuel in the injection pumps vary with engine speed, there is a tendency to supply excess fuel to the engine at certain speeds.

As best seen in Figure 2, if the engine is operating at any constant available speed and torque value between idle and full value as set by the manually operable levers 72 and 85 and controlled by the governor mechanism, the roller 62 will be in engagement with the fuel modulating cam 64. Should the load increase on the engine, the speed will decrease and the governor operated lever 52 and pin 55 thereon, to which the floating lever 57 is pivoted, will then be moved counterclockwise as viewed in Figure 2. An upward force is accordingly applied to the end of the floating lever 57 remote from the fuel control link 59 and this end of the floating lever will move upwardly with the roller 62 thereon rolling toward the larger end of the cam surface 65 on the fuel modulating cam 64 against the action of the pin 74 carried by the manually operable lever 72 which bears on the leaf spring portion 84. This combined upward movement of the right end of the floating lever and movement of the roller 62 thereon relative to the fuel modulating causes downward and slightly clockwise movement of the floating lever relative to the pin 55 causing bending of the spring portion 84 and downward movement of fuel control link 85 to reduce the fuel supplied the engine thereby preventing overloading and smoking thereof.

With the engine operating at any constant available speed and torque between idle and full values, should the load on the engine decrease, the speed will increase and the governor operating lever 52 will be moved clockwise and the pin 55 thereon will cause downward movement of the right end of the floating lever 57. The abutment face 76 on the floating lever will accordingly now be fulcrumed on the pin 74 of the manual lever 72 and the floating lever 57 will rotate counterclockwise causing downward movement of the fuel control link 59 to reduce the engine fuel and also causing the roller 62 to move away from the fuel modulating cam 64. The engine fuel is accordingly reduced to prevent overspeeding of the engine.

It will be apparent that with the engine operating at any available value of speed and torque between idle and full values, the governor mechanism acts either on an increase in engine load or an increase in engine speed to reduce the fuel supplied the engine to prevent overloading and smoking thereof or to prevent overspeeding of the engine.

With the manually operable control levers 72 and 85 in the full speed and torque-setting position and the engine operating at full available speed and torque under control of the governor, the roller 62 on the floating lever 57 is engaged with the smaller end portion of the fuel modulating cam 64 and the spring cap plate 56 is displaced only a slight distance from the end of the high speed plunger 115 having the external flange 113 on which one end of the high speed spring 111 bears. Upon a slight rise in engine speed above the maximum value the high speed weights 33 and 34 move the governor sleeve 38 and thereby the spring cap plate 56 into contact with the plunger 115 and move it to the left against the force of the high speed governor spring 111. Movement of the governor sleeve 38 to the left again causes clockwise movement of the lever 52 and floating lever pivot pin 55. This causes downward movement of the end of the floating lever 57 adjacent the pin 74 of the manual lever 72 fulcruming the abutment face arm 76 of the lever 57 and causing the left end of the floating lever to move the fuel control link 59 downwardly to decrease the engine fuel and thereby the engine speed. The roller 62 on the lever 57 at this time is also moved away from the fuel cam 64. The above operation prevents overspeeding of the engine.

The linkage arrangement provided permits a reduction in the engine fuel and its speed at will, upon counterclockwise operation of the manually operable levers toward idle and shutdown positions. Counterclockwise movement of the manual levers 72 and 85 as viewed in Figure 4 causes pin 74 on the lever 72 to bear on the abutment face arms 76 of the floating lever 57 and move the floating lever 57 upwardly about the pivot pin 55 on the governor operated lever 55. The roller 62 on the floating lever 57 is accordingly moved away from the fuel modulating cam 64 and the fuel control link 59 is moved downwardly to reduce the fuel supplied the engine and slow it down to idling value or to shut the engine down as explained above.

When the combined clutch and auxiliary transmission mechanisms are in their low and intermediate drive ratios including high speed without overdrive, each of the valves 186 supply fluid pressure to its respective cylinder 103 causing the piston 105 to increase the high speed speeder spring rate so that the engine is governed at a higher maximum speed permitting faster acceleration response of the power plant from the engine to the output shaft 190. When the overdrive selector switch 174 is closed and the transmission is in high speed drive ratio, the solenoid operated valves are energized to vent the cylinders 103 to atmosphere thereby reducing the maximum engine speed at which the outward moving tendency of the high speed weights will cause the high speed plungers 115 to move to the right against the biasing action of the high speed speeder springs 111.

It will be seen that a power plant incorporating the above described control mechanism will have improved engine and output acceleration characteristics. Incorporated in a motor vehicle, such a power plant permits the operator to accelerate the vehicle rapidly in the low and intermediate gear drive ratios with efficient engine operation while controlling the vehicle highway speed in the normal road operating gear ratio or overdrive. Other advantageous applications for the use of such a controlled power plant will be apparent to those skilled in the art.

While only one specific embodiment of the invention has been shown and described for the purpose of illustration, it is appreciated that numerous modifications may be made without departing from the spirit and scope in the invention as defined in the following claims.

We claim:

1. In a power train including an engine, a fluid coupling operatively connected to said engine, a plural speed transmission driven by said engine through said fluid coupling, and means for controlling the drive ratio of said transmission, an engine control mechanism for governing the engine at a low idle speed and at a higher maximum speed with modulated manual control of intermediate speeds comprising, in combination, a floating actuating lever operatively connected to an engine fuel regulator, an operating lever movable in response to variations in the engine speed, a cam surface located adjacent the floating lever, said floating actuating lever being pivotable on said operating lever on an axis translatable relative to said cam surface, a speed and fuel supply setting lever movable freely from idle to full speed and torque position having means thereon urging the floating actuating lever into engagement with the cam surface to modify movement of the actuating lever and fuel supplied the engine by movement of the operating lever in response to variations in the engine speed, and means being effective in one operative position of said transmission drive ratio controlling means to limit the engine to a different predetermined maximum engine speed.

2. An engine control for a power train including an engine, a plural speed transmission driven by said engine, and means for controlling the drive ratio of said transmission, said engine control comprising, in combination, a floating actuating lever for an engine fuel regulator, an operating lever movable in response to variations in the engine speed, means for biasing said speed responsive operating lever to limit the engine between a low idle speed and a higher maximum speed, a stationary cam surface located adjacent the floating lever, said floating actuating lever being pivotably mounted on said operating lever about an axis translatable relative to said cam surface, a speed and fuel setting lever movable freely from idle to full speed and torque position providing manual control of intermediate speeds and having means thereon urging the floating actuating lever into engagement with the cam surface to modify movement of the actuating lever and fuel supplied the engine by movement of the operating lever in response to variations in the engine speed, and means being effective in one operative position of said transmission control means to modify operation of said biasing means to limit the engine to a different predetermined maximum engine speed.

3. In a power train including an engine, a plural speed transmission driven by said engine and including a fluid coupling, and means for controlling the drive ratio of said transmission; an engine control mechanism for governing the engine at a low idle speed and at a higher maximum speed with modulated control of intermediate speeds comprising, in combination, an engine fuel regulator having an actuating lever, a speed and fuel setting lever movable freely from idle to full speed and torque position and having means thereon urging said actuating lever in a fuel increasing direction, governor means connected to and modifying fuel supplying movement of the actuating lever and limiting the engine to a predetermined maximum speed, cam-and-follower means associated with said actuating lever for modulating the fuel-supply modifying movement of said governor means at intermediate engine speeds and governor control means operative on said governor means in one operative position of said transmission control means to limit the engine to a different predetermined maximum engine speed.

4. A control mechanism for a power train including an engine, a fluid coupling operatively connected to said engine, and a plural speed transmission driven by said engine through said fluid coupling; said control mechanism comprising, in combination, means for controlling the drive ratio of said transmission, an engine fuel regulator, a speed and fuel setting lever operatively connected to said fuel regulator and movable freely from idle to full speed and torque position, governor means connected to and modifying fuel supplying movement of the fuel regulator and limiting the engine to a predetermined maximum speed, means associated with said fuel regulator effective to modulate the fuel-supplying modifying movement of said governor at intermediate engine speeds and governor control means operative on said governor means in one operative position of said transmission control means to limit the engine to a different predetermined maximum engine speed.

5. An engine control for a power train including an engine, a fluid coupling operatively connected to said engine, a plural speed transmission driven by said engine through said fluid coupling, and means for controlling the drive ratio of said transmission, said engine control comprising, in combination, an engine speed-responsive lever, an engine fuel regulator having a floating actuating lever pivotably mounted on said speed-responsive lever, a cam surface located adjacent one end of said floating lever, means for biasing said speed-responsive lever to limit the engine between a low idle speed and a higher maximum speed, a speed and fuel setting lever movable freely from idle to full speed and torque position controlling intermediate engine speeds and having means thereon urging the floating actuating lever into engagement with the cam surface to modify movement of the actuating lever and fuel supplied the engine by movement of the speed-responsive lever, and means being effective in one operative position of said transmission control means to limit the engine to a different predetermined maximum engine speed.

6. A control mechanism for a power train including an engine, and a plural speed transmission driven by said engine comprising, in combination, a means for controlling the drive ratio for said transmission, a speed-responsive centrifugal means, biasing means including a series of springs arranged for sequentially increasing resistance to the speed response of said centrifugal means, an engine fuel regulator lever means operatively connected to and acting between said centrifugal means, said biasing means, and said fuel regulator, one of said springs engaging said lever means to resist the initial movement of said speed-responsive centrifugal means and being normally effective to limit the engine to a predetermined idle speed, a second spring being adapted to engage said lever means to resist additional movement of said speed-responsive means, a cam means engageable by said lever means to modify the movement thereof when in engagement with said second spring upon variations in engine speed to limit the fuel supplied by said fuel regulator to prevent engine overloading and smoking, a third spring being adapted to engage said lever means to resist additional movement of said speed-responsive means and to limit the engine to a predetermined maximum speed, and spring adjusting means for said third spring effective in one operative position of said transmission control means to limit the engine to a different predetermined maximum engine speed.

7. A control mechanism for a power train including an engine and a plural speed transmission driven by said engine comprising, in combination, means for controlling the drive ratio of said transmission, speed-responsive centrifugal governor means including a series of springs arranged for sequentially increasing resistance to the speed-responsive movement of said centrifugal means, an engine fuel regulator, lever means operatively interconnecting said centrifugal means and said fuel regulator, a cam engageable by said lever means to modify the movement thereof upon variations in engine speed to limit the fuel supplied by said fuel regulator to prevent engine overloading and smoking, one of said springs being adapted to resist the movement of said speed-responsive centrifugal means and being normally effective through said lever means and fuel regulator to limit the engine to a predetermined speed, and spring adjusting means for said spring effective in one operative position of said transmission control means to limit the engine to a different predetermined speed.

8. In a power train including an engine and a plural speed transmission driven by said engine, control mechanism comprising, in combination, means for controlling the drive ratio for said transmission, speed-responsive centrifugal means, an engine fuel regulator lever means acting between said centrifugal means and said fuel regulator, a cam engageable by said lever means to modify the movement thereof upon variations in engine speed to limit the fuel supplied by said fuel regulator to prevent engine overloading and smoking, a lever movable from idle to full speed and torque position having means thereon urging said lever means into engagement with said cam, spring means engaging said lever means and acting therethrough to sequentially increase resistance to the speed-responsive movement of said centrifugal means and to limit the engine to a predetermined speed, and pressure operated adjusting means for said spring means responsive to the operative position of said transmission control means to limit the engine to a different predetermined maximum engine speed.

9. A governing system for a power train including an engine and a plural speed transmission drivingly connectable to said engine through a fluid coupling comprising, in combination, means for establishing a driving connection between said fluid coupling and said transmission, a control means for controlling the drive ratio for said transmission, speed-responsive centrifugal means, biasing means arranged for sequentially increasing resistance to the speed-responsive movement of said centrifugal means, an engine fuel regulator, lever means interconnecting said centrifugal means and said biasing means and operatively connected to the engine fuel regulator, a cam engageable by said lever means to modify the movement thereof upon variations in engine speed to limit the fuel supplied by said fuel regulator to prevent engine overloading and smoking, a control lever movable from idle to full speed and torque position having means thereon urging said lever means into engagement with said cam during periods of engine acceleration and deceleration, said biasing means being disposed to operatively oppose initial movement of said speed-responsive centrifugal means and being normally effective to limit the engine to a predetermined idle speed, said biasing means also being disposed to act in conjunction with said urging means on said control lever to cause said lever means to engage said fuel limiting cam surface upon additional movement of said speed-responsive means, said biasing means being disposed to limit still further movement of said speed-responsive lever to limit the engine to a predetermined maximum speed, and means for decreasing the biasing effect of said biasing means in one operative position of said transmission control means to limit the engine to a different predetermined maximum engine speed.

10. An engine governing device for a power train including an engine and a plural speed transmission driven by said engine comprising, in combination, means for controlling the drive ratio for said transmission, speed-responsive centrifugal means, a series of biasing means arranged for sequentially increasing resistance to the speed-responsive movement of said centrifugal means, an engine fuel regulator, lever means interconnecting said centrifugal means and said biasing means and operatively connected to the engine fuel regulator, a cam engageable by said lever means to modify the movement thereof upon variations in engine speed to limit the fuel supplied by said fuel regulator to prevent engine overloading and smoking, a control lever movable from idle to full speed and torque position having means thereon urging said lever means into engagement with said cam during periods of engine acceleration and deceleration, a first of said biasing means being operatively disposed to resist initial movement of said speed-responsive centrifugal means and being normally effective to limit the engine to a predetermined idle speed, a second of said biasing means being disposed to act in conjunction with said urging means on said control lever to cause said lever means to engage said fuel limiting cam and resisting additional movement of said speed-responsive means, additional biasing means being operatively disposed to resist still further movement of said speed-responsive means to limit the engine to a predetermined maximum speed, and fluid pressure operated means for changing the biasing effect of said additional means in one operative position of said transmission control means to limit the engine to a different predetermined maximum engine speed.

11. In a power train including an engine, a fluid coupling operatively connected to said engine, an auxiliary plural speed transmission drivingly connectable to said engine through said coupling, and means for establishing a driving connection between said fluid coupling and said transmission, means for controlling the drive ratio for said transmission, an engine control mechanism comprising, in combination, a rotatable member, centrifugal members carried by said rotatable member and adapted to move outwardly upon rotation of said rotatable member, biasing means including a series of springs arranged for sequential action in resisting outward movement of said centrifugal members, means acting between said centrifugal members and said springs and comprising an operating lever rotatable in accordance with the speed-responsive movements of said centrifugal members, an engine fuel regulator having an actuating lever, a cam surface engageable by the actuating lever to modify the movement thereof, said actuating lever being pivotably connected to the speed-responsive operating lever on an axis translatable relative to said cam surface, a control lever movable freely from idle to full speed and torque position having means thereon engageable by the actuating lever and acting in conjunction with said engine speed-responsive operating lever upon a variation in engine speed to cause movement of the actuating lever on the cam thereby limiting the fuel supplied to the engine to prevent overloading and smoking of the engine, one of said springs being operatively disposed to engage and to resist movement of said speed-responsive operating lever and being normally effective to limit the engine to a predetermined idle speed, a second spring being adapted to operatively engage and to resist additional movement of said speed-responsive lever while the actuating lever is in contact with said cam surface, a third of said springs being adapted to operatively engage and resist still additional movement of said speed-responsive lever to limit the engine to a predetermined maximum speed, and pressure operated spring adjusting means for said third spring effective in one operative position of said transmission control means to limit the engine to a different predetermined maximum engine speed.

12. In a power train including an engine and a plural speed transmission driven by said engine through a fluid coupling, control mechanism comprising, in combination, means for controlling the drive ratio for said transmission, a rotatable member, centrifugal members carried by said rotatable member and adapted to move outwardly upon rotation of said rotatable member, biasing means arranged for sequentially increasing resistance to the outward movement of said centrifugal members, means acting between said centrifugal members and said biasing means and comprising an operating lever rotatable in accordance with the speed-responsive movements of said centrifugal member, an engine fuel regulator having an actuating lever operatively connected to the speed-responsive lever, a cam surface engageable by the floating lever to modify the movement thereof, said floating lever being pivotable on an axis translatable relative to said cam surface, and a control lever movable freely from idle to full speed and torque position, spring means operable upon movement of said control lever between idle and full speed and torque position to cause movement of the actuating lever along the cam surface thereby limiting the fuel supplied to the engine to prevent overloading and smoking of the engine, said biasing means operatively engaging and resisting the initial movement of said speed-responsive lever to limit the engine to a predetermined idle speed, said biasing means being adapted to provide an additional biasing effect to resist additional movement of said speed-responsive lever while the actuating lever is in contact with said cam surface, said biasing means being adapted to provide still additional increased biasing effect to resist further additional movement of said speed-responsive lever and to limit the engine to a predetermined maximum speed, and fluid pressure adjusting means for changing the biasing effect of said biasing means effective in one operative position of said transmission control means to limit the engine to a different predetermined maximum engine speed.

13. In a governor mechanism, a spring assembly comprising a governor casing having a pair of aligned apertures therein, a cylindrical abutment member threadably extending from one of said apertures, a cylinder closed at one end and threadably secured to said abutment member, a piston reciprocably mounted within said cylinder, said abutment member providing a stop for the axial movement of said piston away from the closed end of said cylinder, a sleeve slidably mounted within the cylindrical abutment member and bearing against said piston at one end thereof, said sleeve having an external flange formed thereon disposed to abut said abutment member at its opposite end, a spring plunger responsive to a governed condition reciprocably mounted within said sleeve and the other of said apertures, a flange on said plunger adapted to abut the periphery of said second aperture, a spring acting between said flanges and normally biasing said sleeve against said abutment member and biasing said plunger to effect a predetermined limit of the governed condition, and pressure supply means connected to said cylinder and adapted to supply pressure to shift said piston into abutment with said abutment member thereby shifting said sleeve to modify the biasing action of said spring on said plunger to effect a different predetermined limit of the governed condition.

14. In a governor mechanism, a series of biasing means arranged for sequentially controlling a governed condition, a first of said biasing means being operatively disposed to limit the governed condition to a predetermined minimum, a second of said biasing means being operatively disposed to limit the governed condition to a predetermined maximum, and a third of said biasing means being operatively disposed to modulate changes in the governed condition between the governed minimum and maximum values, and remote control means for changing the biasing effect of one of said biasing means to effect a change in the control of said governed condition.

References Cited in the file of this patent

UNITED STATES PATENTS

| | | |
|---|---|---|
| 2,257,674 | Dunn | Sept. 30, 1941 |
| 2,302,085 | Wolfe et al. | Nov. 17, 1942 |
| 2,365,204 | Martin et al. | Dec. 19, 1944 |
| 2,421,496 | Grieshaber et al. | June 3, 1947 |
| 2,443,084 | Rhodes | June 8, 1948 |
| 2,474,316 | May et al. | June 28, 1949 |